3,194,292
LOCK WASHER
Francis J. Borowsky, Elkins Park, Pa., assignor to George K. Garrett Company, Division of MSL Industries, Inc., Philadelphia, Pa., a corporation of Minnesota
Filed Dec. 14, 1962, Ser. No. 244,799
2 Claims. (Cl. 151—35)

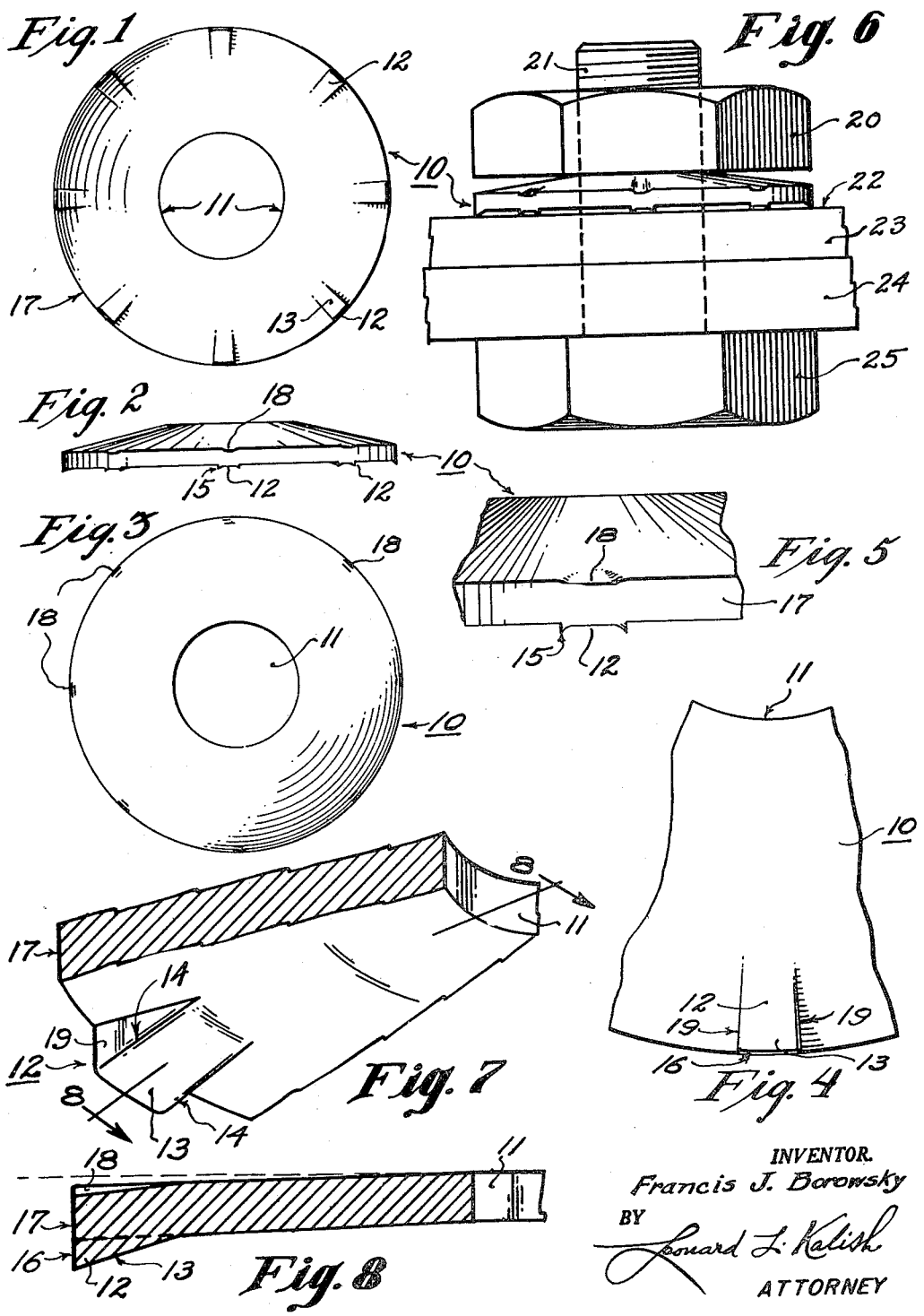

This application is a continuation-in-part of copending application Serial No. 552,124 filed December 9, 1955 (now abandoned).

This invention relates to lock washers, and more particularly, to a frusto-conical or dished lock-washer having a plurality of generally wedge-shaped or prism-shaped burred teeth disposed along its outer basal edge and projecting out of the body portion of the lock washer.

An objection of the present invention is the provision of a lock washer which provides facile gripping action.

A further object of the present invention is the provision of a lock washer that is resistant to breakage or damage.

A still further object of the present invention is the provision of a lock washer which is easy to manufacture and can be mass-produced at a low cost.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the following figures, like reference characters, refer to like parts:

FIGURE 1 is a bottom plan view of the lock-washer of the present invention, showing the concave toothed side or face thereof.

FIGURE 2 is a side elevational view of the same lock washer.

FIGURE 3 is a plan view of the same; viewing the convex side or face thereof, opposite to that shown in FIGURE 1.

FIGURE 4 is an enlarged fragmentary plan view of a portion of said lock washer of the present invention, viewed in the same direction as in FIGURE 1.

FIGURE 5 is an enlarged fragmentary elevational view of the portion of the lock washer shown in FIGURE 4.

FIGURE 6 is a side elevational view of the lock washer of the present invention operatively positioned in use.

FIGURE 7 represents a fragmentary perspective view of the underside of the lock washer embodying the present invention, shown on an enlarged scale.

FIGURE 8 represents a cross-sectional view on line 8—8 of FIGURE 7.

The lock washer of the present invention, designated in its entirety by the reference-numeral 10, is generally frusto-conical or dished, has a central bolt-receiving aperture 11 therein, and is stamped out of sheet-steel and tempered to a spring hardness.

A plurality of circumferentially distributed wedge-shaped or prism-shaped teeth 12 project out of the concave face of the lock washer along the outer marginal or peripheral zone thereof and are uniformly spaced.

The inclined surfaces 13 of the teeth 12 may be generally flat with the longitudinal edges 14 thereof slightly curved in cross-section as indicated in FIGURES 1, 7 and 8, or slight spines or burrs 15 may be provided along the outermost portions of said longitudinal edges as indicated in FIGURES 2 and 5.

The outer ends 16 of the wedge-shaped or prism-shaped teeth 12 lie generally in the same cylindrical surface as that in which the outer peripheral surface 17 of the washer lies.

The upper convex surface of the lock washer is slightly indented opposite to the teeth 12, as indicated at 18, as a result of the stamping or drawing action of the punch and die during the stamping of the lock washer; the teeth 12 being in effect drawn or pressed out of the body of the original sheet-metal of which the lock washer is formed.

The side-surfaces 19 of the wedge-like or prism-like teeth 12 are generally at a right angle to the concave surface of the washer from which they project. Said side-surfaces 19 are formed in integral continuation of the concave face of the washer and without any severance between such side-surfaces and said concave face. Thus, the wedge-like teeth 12 are not resiliently related to the body of the washer but are, instead, fully integral therewith throughout their radial extent and said teeth are rigid in relation to the body of the washer, so that the axial resiliency of the washer is due solely to the dished character of the body thereof and the resiliency of said dished body.

FIGURE 6 shows the lock washer of the present invention operatively disposed between the nut 20 on the bolt 21 and the surface 22 of a work-piece 23 which is bolted to the work-piece 24 between the head 25 of the bolt 21 and the nut 20 and lock washer 10 thereon.

Having shown and described an embodiment of my invention, I claim the following:

1. A dished resilient stamped sheet-steel lock-washer of uniform wall-thickness, having a generally cylindrical outer periphery and having a plurality of circumferentially distributed wedge-like teeth projecting from the concave face thereof along an outer marginal peripheral zone thereof and confined to such zone and rigid in relation to the body of the washer, each of said teeth having two generally radially disposed side-surfaces generally normal to the concave face of the washer and formed in integral continuation thereof throughout the radial extent thereof without any severance between said side-surfaces and said concave face and having a cylindrical outer end-surface between the outer ends of said side-surfaces which end-surface is an extension of the cylindrical outer periphery of the main body of the lock-washer and having a single inclined surface between said side-surfaces and extending from said end-surface towards and merging into the concave face of the lock-washer, said end-surface and said inclined surface intersecting each other at an acute angle and forming a work-engaging acute-angled edge generally parallel with the outer periphery of lock-washer intermediate said teeth thereof, and depressions along the outer periphery of the lock-washer and the convex face thereof opposite to the corresponding teeth thereof.

2. A lock-washer according to claim 1 in which the work-engaging edges of the teeth have burr-like peaks at their opposite ends.

References Cited by the Examiner

UNITED STATES PATENTS

| 506,923 | 10/93 | Miles | 10—73 |
|---|---|---|---|
| 1,139,819 | 5/15 | Smith | 151—34 |
| 1,923,647 | 8/33 | Vera | 151—37 |
| 2,771,591 | 11/56 | Vordtriede | 151—38 |
| 2,778,399 | 1/57 | Mroz | 151—35 |
| 2,983,534 | 5/61 | Heller et al. | 151—35 |

FOREIGN PATENTS 1,043,805  6/53  France.

EDWARD C. ALLEN, *Primary Examiner.*